United States Patent
Kim et al.

(10) Patent No.: US 12,456,882 B2
(45) Date of Patent: Oct. 28, 2025

(54) WIRELESS POWER RECEPTION APPARATUS

(71) Applicant: ELECTRONICS AND TELECOMMUNICATIONS RESEARCH INSTITUTE, Daejeon (KR)

(72) Inventors: Sang-Won Kim, Daejeon (KR); Gwangzeen Ko, Daejeon (KR); Seong-Min Kim, Daejeon (KR); Jung Ick Moon, Daejeon (KR); Je Hoon Yun, Daejeon (KR); In Kui Cho, Daejeon (KR); Saidul Alam Chowdhury, Incheon (KR); Shahid Ali Khan, Incheon (KR); Duk Ju Ahn, Incheon (KR)

(73) Assignee: ELECTRONICS AND TELECOMMUCATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/095,697

(22) Filed: Jan. 11, 2023

(65) Prior Publication Data
US 2023/0387722 A1    Nov. 30, 2023

(30) Foreign Application Priority Data
May 27, 2022    (KR) .................. 10-2022-0065473

(51) Int. Cl.
*H02J 50/12* (2016.01)
(52) U.S. Cl.
CPC .................... *H02J 50/12* (2016.02)

(58) Field of Classification Search
None
See application file for complete search history.

(56) References Cited

U.S. PATENT DOCUMENTS 10,826,328 B2   11/2020   Lee et al.
11,038,432 B2    6/2021   Kajiyama et al.
(Continued)

FOREIGN PATENT DOCUMENTS

JP    WO2019202631 A1    12/2020

OTHER PUBLICATIONS

Jianzhong Zhang et al., "A Wireless Power Transfer System with Dual Switch-Controlled Capacitors for Efficiency Optimization", IEEE Transactions on Power Electronics, vol. 35, No. 6, Jun. 2020.
(Continued)

*Primary Examiner* — Daniel Kessie
(74) *Attorney, Agent, or Firm* — LRK PATENT LAW FIRM (57) ABSTRACT

Provided is a wireless power reception apparatus. The wireless power reception apparatus includes a resonant circuit including a first path and a second path, the first path including a first capacitor and a first gate connected in series, and the second path being connected in parallel with the first path and including a second capacitor and a second gate connected in series and a reception coil connected to the resonant circuit, configured to wirelessly receive power based on a capacitance of the resonant circuit, and to generate power according to the wirelessly received power, wherein the resonant circuit is configured to determine a gate driving signal to operate the first gate and the second gate and wherein the capacitance of the resonant circuit is determined according to the gate driving signal.

11 Claims, 5 Drawing Sheets

(56) References Cited

U.S. PATENT DOCUMENTS

| | | |
|---|---|---|
| 11,283,298 B2 | 3/2022 | Liu et al. |
| 2013/0234527 A1* | 9/2013 | Ishihara .................. H02J 50/12 |
| | | 307/104 |
| 2018/0175811 A1 | 6/2018 | Canning et al. |
| 2019/0165614 A1* | 5/2019 | Afridi ..................... H02M 7/23 |
| 2019/0273400 A1 | 9/2019 | Ahn et al. |
| 2020/0287382 A1* | 9/2020 | Gao ........................ H02J 50/10 |

OTHER PUBLICATIONS

Kentaro Matsuura et al., "Communication-Less Receiver-Side Resonant Frequency Tuning Method for Magnetically Coupled Wireless Power Transfer Systems", 2021 Radio Wireless Symposium.

* cited by examiner

WIRELESS POWER RECEPTION APPARATUS

CROSS-REFERENCE TO RELATED APPLICATION(S)

This application claims the benefit of Korean Patent Application No. 10-2022-0065473 filed on May 27, 2022, in the Korean Intellectual Property Office, the entire disclosure of which is incorporated herein by reference for all purposes.

BACKGROUND

1. Field of the Invention

One or more embodiments relate to a wireless power reception apparatus.

2. Description of Related Art

A wireless power transmission system is optimized for a single receiver having a reactance (LC) resonant frequency equal to a transmission frequency using one transmission coil.

However, when power is wirelessly transmitted to two receivers simultaneously using both sides of a transmission coil (two-way wireless charging system), one side of the transmission coil is shielded so it is easy to shield from electromagnetic waves, but in the case of a two-way wireless charging system, shielding is not possible so it is difficult to solve electromagnetic interference (EMI) problems.

In a two-way wireless charging system, as a reception coil and a transmission coil get closer to one another, a mutual inductance (coupling coefficient) between reception coils increases, and accordingly, a self-inductance of the reception coil changes, thereby changing a resonant frequency and decreasing the system efficiency.

In addition, since large-capacity wireless power transmission uses a spread spectrum transmitter to reduce EMI emissions, the EMI reduces by frequency diffusion bandwidth, compared to a system using a fixed frequency. However, in a spread spectrum method, since a transmission frequency varies over time periodically or arbitrarily, the system efficiency may decrease due to a change in the transmission frequency in receivers that perform LC matching or resonant frequency matching.

SUMMARY

Embodiments provide a method of arbitrarily adjusting a value of a transmission or reception resonant capacitor to maintain constant system efficiency in various environments where an optimal reception frequency of a receiver changes in a wireless power transmission system.

Embodiments provide a tuning method and a circuit that may increase and decrease a value of a resonant capacitor of a wireless power reception apparatus. The present disclosure may be applied to all cases in which adjustment of a value of a capacitor and a receiver is required in a wireless power transmission system.

According to various embodiments, in a wireless power transmission system, the present disclosure may maximize wireless power transmission efficiency by controlling a resonant frequency according to an inductance and a capacitance of a wireless power reception apparatus to coincide with a transmission frequency at which power is wirelessly transmitted and may provide a circuit structure and a method that may increase or decrease the capacitance of the wireless power reception apparatus.

According to an aspect, there is provided a wireless power reception apparatus including a resonant circuit including a first path and a second path, the first path including a first capacitor and a first gate connected in series, and the second path being connected in parallel with the first path and including a second capacitor and a second gate connected in series and a reception coil connected to the resonant circuit, configured to wirelessly receive power based on a capacitance of the resonant circuit, and to generate power according to the wirelessly received power, and the resonant circuit is configured to determine a gate driving signal to operate the first gate and the second gate and transmit the power applied to at 1 east one of the first path and the second path by inputting the gate driving signal to the first gate and the second gate, and the capacitance of the resonant circuit is determined according to the gate driving signal.

The resonant circuit may be configured to control the capacitance of the resonant circuit to be greater than a capacitance of the first capacitor and a capacitance of the second capacitor by inputting the gate driving signal that is delayed to the first gate and the second gate.

The resonant circuit may be configured to control the capacitance of the resonant circuit to be less than a capacitance of the first capacitor and a capacitance of the second capacitor by inputting the gate driving signal that is led to the first gate and the second gate.

The resonant circuit may be configured to apply the gate driving signal having a same duty ratio of the first gate and the second gate to the first gate and the second gate and the first gate and the second gate may be configured to perform zero-voltage switching according to the gate driving signal.

The magnitude of the power may be determined according to a transmission frequency at which the power is wirelessly transmitted and the capacitance of the resonant circuit.

According to an aspect, there is provided a wireless power reception apparatus according to various embodiments including a resonant circuit including a first path and a second path, the first path including a first capacitor and a first gate connected in series, and the second path being connected in parallel with the first path and including a second capacitor and a second gate connected in series and a reception coil connected to the resonant circuit and configured to transmit power generated according to wirelessly received power to the resonant circuit, based on a resonant frequency of the wireless power reception apparatus, and the resonant circuit is configured to transmit the power through at least one of the first path and the second path and has a capacitance that is different from a capacitance of the first capacitor and a capacitance of the second capacitor according to a gate driving signal to control an operation of the first gate and the second gate, and the resonant frequency of the wireless power reception apparatus is determined based on the capacitance of the resonant circuit.

The resonant circuit may be configured to control the capacitance of the resonant circuit to be greater than the capacitance of the first capacitor and the capacitance of the second capacitor by inputting the gate driving signal that is delayed to the first gate and the second gate.

The resonant circuit may be configured to control the capacitance of the resonant circuit to be less than the capacitance of the first capacitor and the capacitance of the second capacitor by inputting the gate driving signal that is led to the first gate and the second gate.

The resonant circuit may be configured to apply the gate driving signal having a same duty ratio of the first gate and the second gate to the first gate and the second gate and the first gate and the second gate may be configured to perform zero-voltage switching according to the gate driving signal.

The magnitude of the power may be determined according to a transmission frequency at which the power is wirelessly transmitted and the capacitance of the resonant circuit.

According to an aspect, there is provided a wireless power reception apparatus according to various embodiments including a reception coil configured to wirelessly receive power based on a resonant frequency of the wireless power reception apparatus and to generate power according to the wirelessly received power, a resonant circuit including a plurality of capacitors and a plurality of gates and configured to transmit the generated power, received from the reception coil, by inputting a gate driving signal to the plurality of gates, and the resonant circuit is configured to control a capacitance of the resonant circuit, using the gate driving signal input to the plurality of gates, and the resonant frequency is determined based on the capacitance of the resonant circuit.

The resonant circuit may be configured to control the capacitance of the resonant circuit to be greater than a capacitance of each of the plurality of capacitors by inputting the gate driving signal that is delayed to the plurality of gates.

The resonant circuit may be configured to control the capacitance of the resonant circuit to be less than a capacitance of each of the plurality of capacitors by inputting the gate driving signal that is led to the plurality of gates.

The magnitude of the generated power may be determined according to a transmission frequency at which the power is wirelessly transmitted and the capacitance of the resonant circuit.

Additional aspects of example embodiments will be set forth in part in the description which follows and, in part, will be apparent from the description, or may be learned by practice of the disclosure.

According to embodiments, the present disclosure may control a resonant frequency or a capacitance of a wireless power reception apparatus and may maintain maximum wireless power transmission efficiency by changing an optimal reception frequency according to a change of a transmission frequency or an environment of a wireless power transmission system.

According to embodiments, the present disclosure may control a resonant circuit or a capacitance of the resonant circuit of a wireless power reception apparatus to increase or decrease, may perform zero-voltage switching when the capacitance of the resonant circuit increases or decreases, and operation loss due to capacitance control may be minimized.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. However, various alterations and modifications may be made to the example embodiments. Here, the example embodiments are not meant to be limited by the descriptions of the present disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of the example embodiments, a detailed description of well-known related structures or functions will be omitted when it is deemed that such description will cause ambiguous interpretation of the present disclosure.

Figure 1:
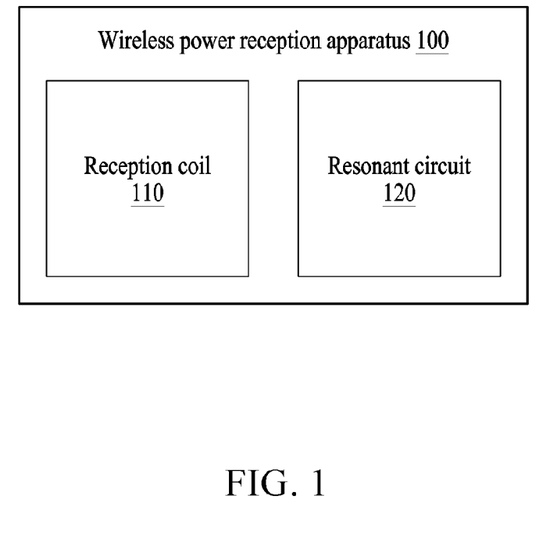
FIG. 1 is a block diagram schematically illustrating a wireless power reception apparatus according to an embodiment.

FIG. 1 is a block diagram schematically illustrating a wireless power reception apparatus 100 according to various embodiments.

Referring to FIG. 1, the wireless power reception apparatus 100 according to various embodiments may include at least one of a reception coil 110 and a resonant circuit 120.

For example, the reception coil 110 may generate power by wirelessly receiving power. For example, the reception coil 110 may generate power by wirelessly receiving power from a wireless power transmission apparatus that wirelessly transmits power.

For example, power generated in the reception coil 110 may be determined according to a resonant frequency of the wireless power reception apparatus 100. For example, the resonant frequency of the wireless power reception apparatus 100 may be determined according to an inductance of the reception coil 110 and a capacitance of the resonant circuit 120. For example, the inductance of the reception coil 110 and the capacitance of the resonant circuit 120 may be referred to as a reception inductance and a reception capacitance, respectively.

For example, when the resonant frequency of the wireless power reception apparatus 100 coincides with a transmission frequency at which power is wirelessly transmitted to the wireless power reception apparatus 100 or a transmission frequency, a magnitude of the power generated by the reception coil 110 may be maximized.

For example, the resonant circuit 120 may transmit power transmitted from the reception coil 110 to a connected load (e.g., a battery, etc.). For example, the power received from the reception coil 110 in the resonant circuit 120 may be transmitted to a connected load.

For example, the resonant circuit 120 may include a plurality of capacitors and a plurality of gates. Each of the plurality of capacitors may be connected to the plurality of gates in series. Each of the capacitors and each of the gates connected in series may be connected in parallel, and may be connected between a load and the reception coil 110.

For example, the plurality of gates may operate according to a gate driving signal. For example, when a gate driving signal is input to a gate, a path connected in the order of the reception coil 110, a capacitor, the gate, and a load may be formed.

For example, the resonant circuit 120 may control the gate driving signal input to the plurality of gates. For example, the resonant circuit 120 may control the capacitance of the resonant circuit 120 by delaying or leading the gate driving signal.

For example, power generated in the reception coil 110 may be transmitted through a path formed through a capacitor connected in series with a gate to which the gate driving signal is input. A voltage according to power received wirelessly may be induced in the reception coil 110 and a current may flow along a path formed by the induced voltage.

A phase of the current flowing through the formed path may be determined according to an operation of the gate, for example, the timing at which the gate driving signal is input to the gate. By controlling the timing at which the gate driving signal is input to a plurality of gates, the phase of the current flowing through capacitors respectively connected in series to the plurality of gates may be controlled.

For example, adjusting the timing of the gate driving signal input to the plurality of gates may mean that the capacitance of the resonant circuit 120 is adjusted. For example, by controlling the timing of the gate driving signal input to the plurality of gates, the phase of the current flowing through the reception coil 110 may be controlled.

For example, by controlling the timing at which the gate driving signal is input to the plurality of gates, the phase of the current flowing through the reception coil 110 may differ by 90 degrees (°) from the voltage induced in the reception coil 110.

The changing of the phase of the current flowing through the reception coil 110 may mean that the capacitance of the resonant circuit 120 is adjusted. For example, when the capacitance of the resonant circuit 120 changes, the phase of the current flowing through the reception coil 110 may change. Conversely, the changing of the phase of the current flowing through the reception coil 110 may mean that the capacitance of the resonant circuit 120 changes.

For example, the resonant frequency of the wireless power reception apparatus 100 may be determined according to the inductance of the reception coil 110 and the capacitance of the resonant circuit 120. Since the capacitance of the resonant circuit 120 may be determined according to the gate driving signal, the resonant frequency of the wireless power reception apparatus 100 may be determined according to the gate driving signal.

Figure 2:
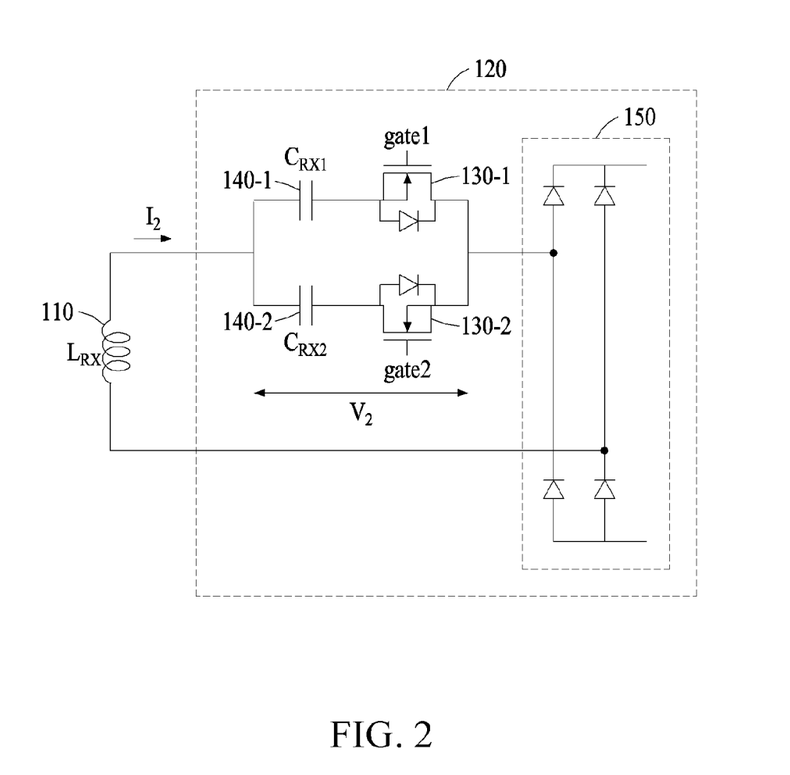
FIG. 2 is a circuit diagram schematically illustrating wireless power reception apparatus according to an embodiment.

FIG. 2 is a circuit diagram schematically illustrating wireless power reception apparatus 100 according to various embodiments.

Referring to FIG. 2, the wireless power reception apparatus 100 according to various embodiments may include the reception coil 110 and the resonant circuit 120. In FIG. 2, the reception coil 110 is Liza, a first capacitor 140-1 is $C_{RX1}$, a second capacitor 140-2 is $C_{RX2}$, a first gate 130-1 is gate 1, and a second gate 130-2 is gate 2.

Referring to FIG. 2, the resonant circuit 120 according to various embodiments may include the first gate 130-1, the second gate 130-2, the first capacitor $C_{RX1}$ 140-1, the second capacitor $C_{RX2}$ 140-2, and a plurality of diodes 150. The resonant circuit 120 may include a first path in which the first capacitor $C_{RX1}$ 140-1 and the first gate 130-1 are connected in series and a second path in which the second capacitor $C_{RX2}$ 140-2 and the second gate 130-2 are connected in series. The first path and the second path may be connected in parallel. One side of the first path and the second path connected in parallel may be connected to the reception coil 110 and the other side may be connected to the plurality of diodes 150.

For example, according to an operation of the first gate 130-1 and the second gate 130-2, power transmitted through the first path or the second path may be transmitted to a load and a battery, etc., which may be connected to a rear end through the plurality of diodes 150.

Referring to FIG. 2, the resonant circuit 120 may determine a gate driving signal for operating the first gate 130-1 and the second gate 130-2. For example, the resonant circuit 120 may determine the gate driving signal according to a magnitude of the capacitance of the resonant circuit 120 to be controlled.

For example, the resonant circuit 120 may determine a delayed gate driving signal to control the capacitance of the resonant circuit 120 to be greater than a capacitance of the first capacitor $C_{RX1}$ 140-1 and a capacitance of the second capacitor $C_{RX2}$ 140-2.

For example, the resonant circuit 120 may determine a gate driving signal that is led to control the capacitance of the resonant circuit 120 to be less than the capacitance of the first capacitor $C_{RX1}$ 140-1 and the capacitance of the second capacitor $C_{RX2}$ 140-2.

For example, the delayed or led gate driving signal may mean a delayed or led signal compared to a reference gate driving signal applied to the first gate 130-1 or the second gate 130-2 based on a phase of a voltage induced in the reception coil 110. For example, when a magnitude of the voltage induced to the reception coil 110 is positive, the reference gate driving signal may be input to one of the first gate 130-1 and the second gate 130-2. When the magnitude of the voltage induced to the reception coil 110 is negative, the reference gate driving signal may be input to the other one of the first gate 130-1 and the second gate 130-2.

For example, the delayed gate driving signal may mean a signal in which the reference gate driving signal is moved in parallel in a positive direction by t seconds. For example, the led gate driving signal may mean a signal in which the reference gate driving signal is moved in parallel in a negative direction by t seconds.

For example, by inputting the gate driving signal to the first gate 130-1 and the second gate 130-2 by the resonant circuit 120, power generated from the reception coil 110 may be transmitted through at least one of the first path and the second path to a connected load.

For example, when the gate driving signal is input to the first gate 130-1 and the first gate 130-1 operates, power may be transmitted through the first path to a connected load. When the gate driving signal is input to the second gate 130-2 and the second gate 130-2 operates, power may be transmitted through the second path to a connected load.

For example, the wireless power reception apparatus 100 may control a phase of a current $I_2$ flowing through the reception coil 110 by controlling the gate driving signal input to the first gate 130-1 and the second gate 130-2.

For example, when the first gate 130-1 operates, the current $I_2$ flowing through the reception coil 110 may mean a current flowing through the first capacitor $C_{RX1}$ 140-1. When the second gate 130-2 operates, the current $I_2$ flowing through the reception coil 110 may mean a current flowing through the second capacitor $C_{RX2}$ 140-2.

The wireless power reception apparatus 100 may control the phase of the current flowing through the first capacitor $C_{RX1}$ 140-1 or the second capacitor $C_{RX2}$ 140-2 by controlling the gate driving signal input to the first gate 130-1 and the second gate 130-2.

The controlling of the phase of the current flowing through the first capacitor $C_{RX1}$ 140-1 or the second capacitor $C_{RX2}$ 140-2 may be understood as controlling the capacitance of the resonant circuit 120.

The operation in which the wireless power reception apparatus 100 controls the capacitance of the resonant circuit 120 by inputting the delayed or led gate driving signal to the first gate 130-1 and the second gate 130-2 is described with reference to FIGS. 3 and 4. For example, a magnitude of power generated by the reception coil 110 may be determined according to the resonant frequency of the wireless power reception apparatus 100 and the transmission frequency through which power is wirelessly transmitted to a connected load. The resonant frequency of the wireless power reception apparatus 100 may be determined according to the inductance of the reception coil 110 and the capacitance of the resonant circuit 120. The wireless power reception apparatus 100 may control the capacitance of the resonant circuit 120 by using the gate driving signal.

For example, the wireless power reception apparatus 100 may perform zero-voltage switching. For example, when the gate driving signal input to the first gate 130-1 is turned on, the voltage difference at both ends of the first gate is 0V, and when the gate driving signal input to the second gate 130-2 is turned on, the voltage difference at both ends of the second gate is 0V. For example, when the gate driving signal input to the second gate 130-2 is turned on, the voltage difference V2 at both ends may be zero.

Figure 3:
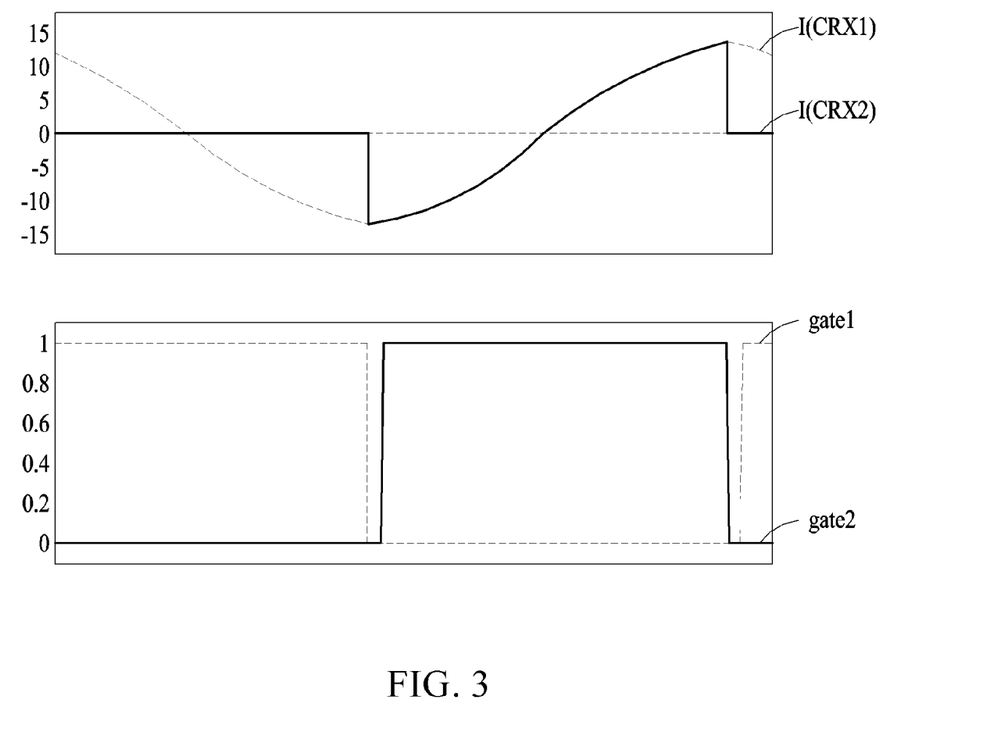
FIGS. 3 and 4 are diagrams illustrating a current applied to a capacitor according to control of a gating driving signal according to an embodiment.
Figure 4:
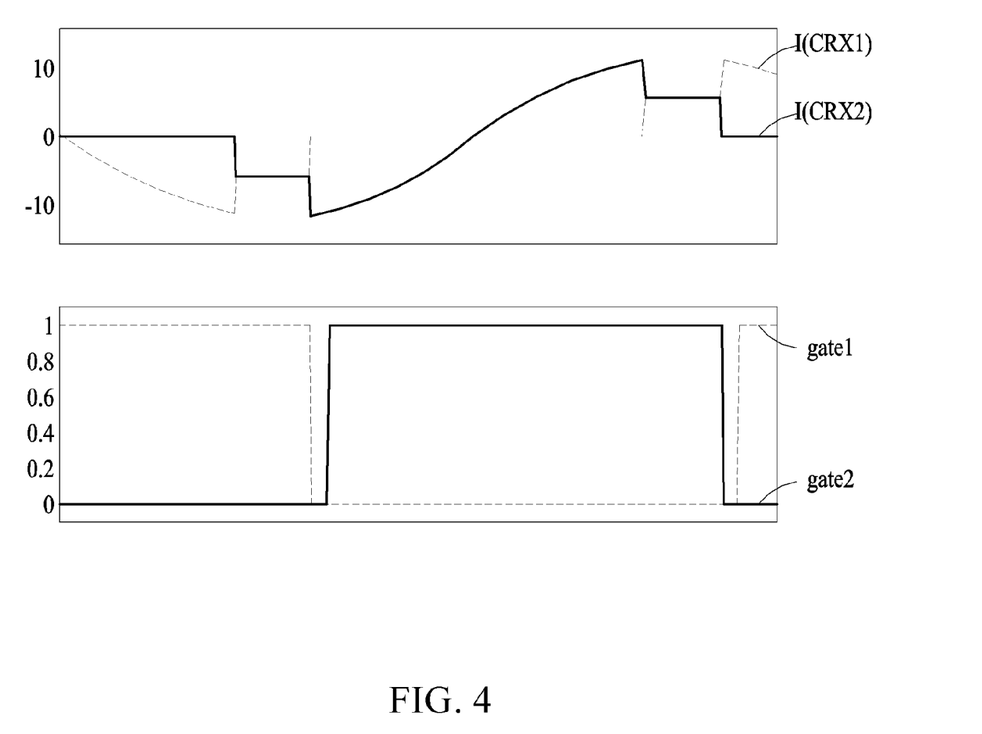

FIGS. 3 and 4 are diagrams illustrating a current applied to a capacitor according to control of a gating driving signal according to various embodiments. FIGS. 3 and 4 are diagrams illustrating a magnitude of a current flowing through the first capacitor $C_{RX1}$ 140-1 and the second capacitor $C_{RX2}$ 140-2 when the gate driving signal is input to the first gate 130-1 and the second gate 130-2 of the wireless power reception apparatus 100 of FIG. 2.

For example, in FIGS. 3 and 4, the gate driving signal may be input to the first gate 130-1 and the second gate 130-2 at a duty ratio of 1:1 or a duty of 50%, respectively.

FIG. 3 is a diagram illustrating current $I\,C_{RX1}$ flowing through the first capacitor $C_{RX1}$ 140-1 and current $I\,C_{RX2}$ flowing through the second capacitor $C_{RX2}$ 140-2 when the gate driving signal led by the wireless power reception apparatus 100 is input to the first gate 130-1 and the second gate 130-2 of FIG. 2.

In FIG. 3, the gate driving signal input to the first gate 130-1 and the second gate 130-2 in the resonant circuit 120 of the wireless power reception apparatus 100 may represent a led signal compared to the reference gate driving signal.

FIG. 4 is a diagram illustrating the current $I\,C_{RX1}$ flowing through the first capacitor $C_{RX1}$ 140-1 and the current $I\,C_{RX2}$ flowing through the second capacitor $C_{RX2}$ 140-2 when the wireless power reception apparatus 100 inputs the delayed gate driving signal to the first gate 130-1 and the second gate 130-2 of FIG. 2 according to various embodiments.

In FIG. 4, the gate driving signal input to the first gate 130-1 and the second gate 130-2 in the resonant circuit 120 of the wireless power reception apparatus 100 may represent a delayed signal compared to the reference gate driving signal.

Referring to FIGS. 3 and 4, the current $I_2$ flowing through the reception coil 110 may be expressed as the sum of the current $I\,C_{RX1}$ flowing through the first capacitor $C_{RX1}$ 140-1 and the current $I\,C_{RX2}$ flowing through the second capacitor $C_{RX2}$ 140-2. As shown in FIGS. 3 and 4, in the case the wireless power reception apparatus 100 inputs the led gate driving signal to the first gate 130-1 and the second gate 130-2 and in the case the wireless power reception apparatus 100 inputs the delayed gate driving signal to the first gate 130-1 and the second gate 130-2, it may be confirmed that the phase of the current $I_2$ flowing through the reception coil 110 may be different.

As shown in FIGS. 3 and 4, the changing of the phase of the current $I_2$ flowing through the reception coil 110 according to the gate driving signal input to the first gate 130-1 and the second gate 130-2 may mean that the capacitance of the resonance circuit 120 changes.

For example, when the led gate driving signal is input to the first gate 130-1 and the second gate 130-2, the capacitance of the resonant circuit 120 may decrease, and the current $I\,C_{RX1}$ and the current $I\,C_{RX2}$ may flow through the first capacitor $C_{RX1}$ 140-1 and the second capacitor $C_{RX2}$ 140-2, respectively, as shown in FIG. 3.

For example, when the delayed gate driving signal is input to the first gate 130-1 and the second gate 130-2, the capacitance of the resonant circuit 120 may increase and the current $I\,C_{RX1}$ and the current $I\,C_{RX2}$ may flow through the first capacitor $C_{RX1}$ 140-1 and the second capacitor $C_{RX2}$ 140-2, respectively, as shown in FIG. 4.

For example, the first gate 130-1 and the second gate 130-2 of the resonant circuit 120 may perform zero-voltage switching.

In FIG. 3, when the gate driving signal input to the first gate 130-1 is turned off, the current $I\,C_{RX2}$ may flow through the second capacitor $C_{RX2}$ 140-2 until the gate driving signal input to the second gate 130-2 is turned on.

For example, in FIG. 3, when the gate driving signal input to the first gate 130-1 is turned off, the current $I\,C_{RX2}$ flowing through the second capacitor $C_{RX2}$ 140-2 may flow through the diode included in the second gate 130-2 until the gate driving signal input to the second gate 130-2 is turned on. When the gate driving signal input to the second gate 130-2 is turned on, the voltage difference (e.g., V2 in FIG. 2) at both ends of the second path becomes zero and the second gate 130-2 may perform zero-voltage switching.

When the gate driving signal input to the first gate 130-1 is turned off, the gate driving signal input to the second gate 130-2 is turned off substantially the same as when the gate driving signal input to the second gate 130-2 is turned on, and when the gate driving signal input to the first gate 130-1 is turned on, the first gate 130-1 may perform zero-voltage switching.

In FIG. 4, when the gate driving signal input to the first gate 130-1 is turned on, a short section in which the current I $C_{RX1}$ and the current I $C_{RX2}$ flow simultaneously through the first capacitor $C_{RX1}$ 140-1 and the second capacitor $C_{RX2}$ 140-2 may exist.

For example, in FIG. 4, when the gate driving signal input to the first gate 130-1 is turned off, the current I $C_{RX2}$ flowing through the second capacitor $C_{RX2}$ 140-2 may flow through the diode included in the second gate 130-2 until the gate driving signal input to the second gate 130-2 is turned on. When the gate driving signal input to the second gate 130-2 is turned on, the voltage difference at both ends of the second path becomes zero and the second gate 130-2 may perform zero-voltage switching.

For example, even when the gate driving signal input to the first gate 130-1 in FIG. 4 is turned on from off, the description of the above example may be applied thereto substantially the same. When the gate driving signal input to the first gate 130-1 is turned on, the voltage difference at both ends of the first path becomes zero and the first gate 130-1 may perform zero-voltage switching.

Figure 5:
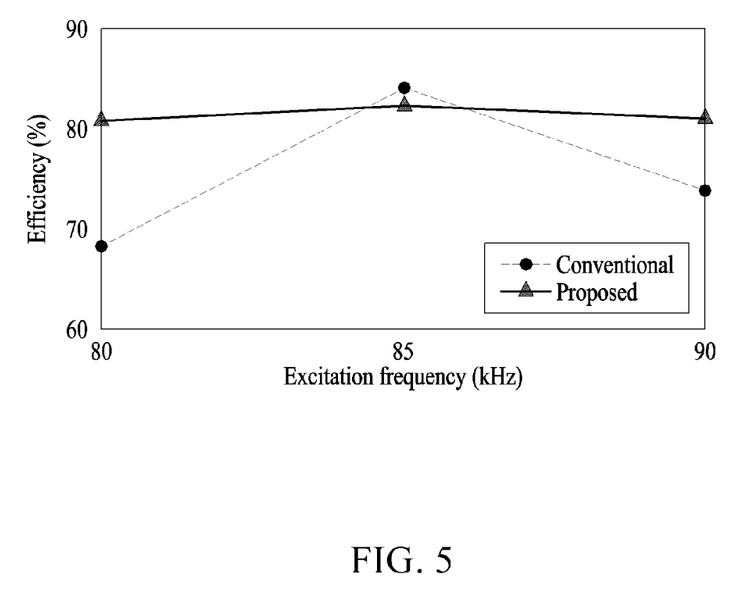
FIG. 5 is a diagram illustrating wireless power transmission efficiency of a wireless power reception apparatus according to an embodiment.

FIG. 5 is a diagram illustrating wireless power transmission efficiency of a wireless power reception apparatus 100 according to various embodiments.

In a wireless power transmission/reception system operating in the 85 kHz band, when wireless power transmission frequencies are 80 kHz, 85 kHz, and 90 kHz, respectively, FIG. 5 is a diagram illustrating the efficiency of the wireless power reception apparatus 100 (proposed in FIG. 5) including an 85 kHz fixed matching receiver (conventional in FIG. 5) and the resonant circuit 120 according to the present disclosure.

Referring to FIG. 5, the fixed matching receiver has a large decrease in efficiency when the transmission frequency deviates (80 kHz and 90 kHz) from the center frequency 85 kHz. However, it may be seen that the wireless power reception apparatus 100 according to this present disclosure maintains constant efficiency even when the transmission frequency changes at 85 kHz and exhibits higher efficiency than the fixed matching receiver.

The method according to embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single example embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products. The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A wireless power reception apparatus comprising:
   a resonant circuit comprising a first component and a second component, the first component comprising a first capacitor and a first gate connected in series, and the second component being connected in parallel with the first component and comprising a second capacitor and a second gate connected in series; and
   a reception coil connected in series to the resonant circuit, and configured to wirelessly receive power at a resonant frequency determined based on a capacitance of the resonant circuit, and to output power according to the wirelessly received power, wherein current flowing through the reception coil is divided between the first and second capacitors such that the current flowing through the reception coil equals a sum of current flowing through the first capacitor and current flowing through the second capacitor,
   wherein the resonant circuit is configured to determine a gate driving signal to operate the first gate and the second gate, and to transmit the power applied to at least one of the first component and the second component by inputting the gate driving signal to the first gate and the second gate, and
   wherein the capacitance of the resonant circuit is determined according to the gate driving signal,
   wherein the resonant circuit is configured to control the capacitance of the resonant circuit to be greater than a capacitance of the first capacitor and a capacitance of the second capacitor by inputting a delayed gate driving signal to the first gate and the second gate, wherein the delayed gate driving signal indicates a delayed signal compared to a reference gate driving signal applied to the first or second gate based on a phase of a voltage induced in the reception coil.

2. The wireless power reception apparatus of claim 1, wherein the resonant circuit is configured to control the capacitance of the resonant circuit to be less than a capacitance of the first capacitor and a capacitance of the second capacitor by inputting a led gate driving signal to the first gate and the second gate, wherein the led gate driving signal indicates a signal that is led compared to a reference gate driving signal applied to the first or second gate based on a phase of a voltage induced in the reception coil.

3. The wireless power reception apparatus of claim 1, wherein:
   the resonant circuit is configured to apply the gate driving signal having a same duty ratio of the first gate and the second gate to the first gate and the second gate, and
   the first gate and the second gate are configured to perform zero-voltage switching according to the gate driving signal.

4. The wireless power reception apparatus of claim 1, wherein a magnitude of the power is determined according to a transmission frequency at which the power is wirelessly transmitted and the capacitance of the resonant circuit.

5. A wireless power reception apparatus comprising:
   a resonant circuit comprising a first component and a second component, the first component comprising a first capacitor and a first gate connected in series, and the second component being connected in parallel with the first component and comprising a second capacitor and a second gate connected in series; and
   a reception coil connected to the resonant circuit and configured to transmit power generated according to a wirelessly received power to the resonant circuit, based on a resonant frequency of the wireless power reception apparatus, wherein current flowing through the reception coil is divided between the first and second capacitors such that the current flowing through the reception coil equals a sum of current flowing through the first capacitor and current flowing through the second capacitor,
   wherein the resonant circuit is configured to transmit the power through at least one of the first component and the second component and has a capacitance that is different from a capacitance of the first capacitor and a capacitance of the second capacitor according to a gate driving signal to control an operation of the first gate and the second gate, and
   wherein the resonant frequency of the wireless power reception apparatus is determined based on the capacitance of the resonant circuit,
   wherein the resonant circuit is configured to control the capacitance of the resonant circuit to be greater than the capacitance of the first capacitor and the capacitance of the second capacitor by inputting a delayed gate driving signal to the first gate and the second gate, wherein the delayed gate driving signal indicates a delayed signal compared to a reference gate driving signal applied to the first or second gate based on a phase of a voltage induced in the reception coil.

6. The wireless power reception apparatus of claim 5, wherein the resonant circuit is configured to control the capacitance of the resonant circuit to be less than the capacitance of the first capacitor and the capacitance of the second capacitor by inputting a led gate driving signal to the first gate and the second gate, wherein the led gate driving signal indicates a signal that is led compared to a reference gate driving signal applied to the first or second gate based on a phase of a voltage induced in the reception coil.

7. The wireless power reception apparatus of claim 5, wherein:
   the resonant circuit is configured to apply the gate driving signal having a same duty ratio of the first gate and the second gate to the first gate and the second gate, and
   the first gate and the second gate are configured to perform zero-voltage switching according to the gate driving signal.

8. The wireless power reception apparatus of claim 5, wherein a magnitude of the power is determined according to a transmission frequency at which the power is wirelessly transmitted and the capacitance of the resonant circuit.

9. A wireless power reception apparatus comprising:
   a reception coil configured to wirelessly receive power based on a resonant frequency of the wireless power reception apparatus and to output power according to the wirelessly received power; and
   a resonant circuit comprising a plurality of capacitors and a plurality of gates and configured to receive the generated power from the reception coil and to transmit the generated power by inputting a gate driving signal to the plurality of gates, wherein current flowing through the reception coil is divided between the first and second capacitors such that the current flowing through the reception coil equals a sum of currents flowing through the plurality of capacitors, wherein the resonant circuit is configured to control a capacitance of the resonant circuit, using the gate driving signal input to the plurality of gates, and
   wherein the resonant frequency is determined based on the capacitance of the resonant circuit,
   wherein the resonant circuit is configured to control the capacitance of the resonant circuit to be greater than a capacitance of each of the plurality of capacitors by inputting a delayed gate driving signal to the plurality of gates, wherein the delayed gate driving signal indicates a delayed signal compared to a reference gate driving signal applied to the first or second gate based on a phase of a voltage induced in the reception coil.

10. The wireless power reception apparatus of claim 9, wherein the resonant circuit is configured to control the capacitance of the resonant circuit to be less than a capacitance of each of the plurality of capacitors by inputting a led gate driving signal to the plurality of gates, wherein the led gate driving signal indicates a signal that is led compared to a reference gate driving signal applied to the first or second gate based on a phase of a voltage induced in the reception coil.

11. The wireless power reception apparatus of claim 9, wherein a magnitude of the generated power is determined according to a transmission frequency at which the power is wirelessly transmitted and the capacitance of the resonant circuit.

\* \* \* \* \*